United States Patent

[11] 3,607,813

[72] Inventors Chester L. Purcell;
  John B. Wheeler, III, both of Somerville, N.J.
[21] Appl. No. 855,746
[22] Filed Sept. 5, 1969
[45] Patented Sept. 21, 1971
[73] Assignee Union Carbide Corporation
  New York, N.Y.
  Continuation-in-part of application Ser. No. 584,086, Oct. 4, 1966, now abandoned.

[54] PRINTING INK COMPOSITIONS
  10 Claims, No Drawings

[52] U.S. Cl. .................................................... 260/29.6,
  106/20, 260/41
[51] Int. Cl. ........................................................ C08f 45/24,
  C09d 5/02
[50] Field of Search ........................................... 106/19–32;
  260/41, 29.6 EM, 29.6 AI, 29.6 AD, 80.3

[56] References Cited
UNITED STATES PATENTS

| | | | |
|---|---|---|---|
| 2,772,175 | 11/1956 | Beatty et al. ................ | 106/26 |
| 3,169,880 | 2/1965 | Strauss ....................... | 106/30 X |
| 3,264,272 | 8/1966 | Rees ........................... | 260/41 X |
| 3,364,164 | 1/1968 | Lyons ......................... | 260/29.6 EM |
| 3,486,929 | 12/1969 | Anspon et al. .............. | 260/29.6 EM X |

FOREIGN PATENTS

| 752,337 | 7/1956 | Great Britain ............... | 106/22 |
|---|---|---|---|

*Primary Examiner*—Julius Frome
*Attorneys*—Paul A. Rose, Aldo J. Cozzi and Bernard F. Crowe

ABSTRACT: Printing ink compositions having excellent gloss, adhesion and scuff resistance on such substrates as paper, treated polyethylene, aluminum or glass have been formulated from inorganic salts of interpolymers of ethylene and an acrylic acid and pigments.

3,607,813

PRINTING INK COMPOSITIONS

BACKGROUND OF THE INVENTION

This is a continuation-in-part of application Ser. No. 584,086 filed Oct. 4,1966, now abandoned.

This invention relates to printing ink compositions and more particularly, to those containing a polymeric binder.

There is a continuing need for printing inks which are applicable to various substrates such as paper, treated polyethylene, aluminum foil, glass and the like, with equal facility. Among the criteria, printing inks should show excellent gloss, adhesion, and scuff resistance, following its application to the particular substrate.

Another important requirement of printing inks is the ability to easily and conveniently clean printing equipment after shut downs or between runs. The products of this invention are easily removed from rollers, plates and other parts of the press by a simple soap water or ammonia-soap-water wash. In contrast many other water or water-alcohol diluted polymer systems such as styrene-butadiene or polyacrylate latex systems are not easily removed from printing equipment after the polymers have dried due to water evaporation. In this latter case, the polymers are not truly soluble or dispersible in alkaline systems, except under the conditions employed during polymerization.

SUMMARY OF THE INVENTION

It has now been found that printing inks meeting the above criteria, are provided by compositions which comprise:

a. about 5 to 30 percent by weight of an inorganic salt of an interpolymer of ethylene and an acrylic acid said salt having monovalent cations:

b. about 5 to 50 percent by weight of pigment;

c. about 0 to 40 percent by weight of an aliphatic monohydroxy alcohol selected from the group consisting of methanol, ethanol and isopropanol;

d. the remainder, water.

DESCRIPTION OF THE INVENTION

The starting interpolymers used to make the interpolymer salts of this invention are known in the art and can be made by the free radical initiated, random interpolymerization of ethylene with either acrylic or methacrylic acids using bulk, solution, suspension or emulsion polymerization techniques. The term "acrylic acid" is used generically to include both $CH_2=CHCO_2H$ and $CH_2=_{CCH_3}CO_2H$.

The acrylic acid content of the starting interpolymers is preferably in the range of about 10–15 mole percent of the total interpolymer although contents of about 1 and 50 mole percent can also be employed, if desired. The starting interpolymer used to make the interpolymer salts of this invention should contain sufficient acrylic acid to permit the formation of at least water-dispersible salts and preferably water-soluble salts. Solubility increases as the acrylic acid salt moiety content of the interpolymer is increased. The acrylic acid salt moiety content of the interpolymer which is required to render the interpolymer water-dispersible can be decreased as the molecular weight of the interpolymer is decreased.

The acrylic acid salt moiety content of these interpolymer salts is preferably from about 3 to 25 mole percent of the total interpolymer salt although other ranges can also be employed if desired. The term "Acrylic acid salt moiety" includes both the acrylic acid anion and the monovalent cation. The cations used in the carboxyl containing interpolyer salts of the present invention are either alkali metal cations such as, $Na^+$, $K^+$, $Li^+$, and the like or $NH_4^+$.

No special mixing equipment is required for the preparation of the salts from the interpolymers other than what is conveniently used in the art for simple mixing and heating operations.

For the preparation of ammonium polymer salts, atmospheric pressure is preferred although both subatmospheric and superatmospheric pressure can also be used if desired. Where atmospheric pressures are used, a temperature not exceeding about 98° is preferred because of the reversible character of the ammonium acrylate formed. Where superatmospheric pressures are used this temperature of course can be exceeded. With the preparation of alkali metal interpolymer salts pressure is not at all critical.

The interpolymer salts used in this invention can be prepared by neutralizing the starting ethylene-acrylic acid interpolymer with metal salts, such as carbonates or bicarbonates, metal bases such as hydroxides or alkoxides, ammonium hydroxide, metal alkyls such as sodium methyl, butyl lithium, and the like, metal aryls such as pheynl lithium, potassium naphthalene, and the like, hydrides of sodium, potassium or lithium, amides of sodium or potassium, oxides such as sodium peroxide or in the case of alkali metal salts even with the free alkali metal itself. Preferred bases are ammonium hydroxide. Any method known in the art can be used to effect this neutralization process. It has been found convenient and economical to blend the starting carboxyl-containing olefin polymer and a metal base on a two roll mill, in a Banbury mixer or with similar commercially available mixing equipment as well as by mixing with aqueous solutions of bases. This latter method is preferred for preparing ammonium salt solutions and dispersions.

The concentration of interpolymer salts used in the compositions of this invention can range from about 5 to 30 percent by weight. It is preferred however to employ about 10 to 25 percent.

The monovalent cations present in the interpolymer salts can be either alkali metal cations, $NH^+_4$, or a combination of both.

Although the amount of pigment present in the printing ink compositions can range from about 5 to 50 percent by weight, it is preferred to employ 15 to 30 percent. The type of pigment used is not critical but depends upon the color desired in the final ink. Thus for example, if white is the desired ink color one may employ clay, diatomite, precipitated barium sulfate, calcium carbonate, magnesium carbonate, lithopone, titanium dioxide, zinc oxide, white lead, and the like. Black inks may be obtained by using carbon black such as channel or furnace carbon black. Colored inks may be obtained by using for example iron blues (complex ferriferro cyanides), ultra marine blue, chrome yellow, chrome red, chrome orange, chrome green, cadmium yellow, cadmium red, molybdate orange, and the like. The above recited pigments are all of the inorganic type. However one may also employ organic pigments such as for example, azo colors, Hansa yellows, triphenyl methane derivatives, phthalo cyanine pigments and the like.

The preferred aliphatic monohydroxy alcohol is ethanol although other alcohols such as methanol, isopropanol and the like having up to 4 carbon atoms may also be used if desired. Where it is desired to use one 5 to 40 percent by weight of aliphatic monohydroxy alcohol may be used in these printing ink compositions.

While not necessary, a thickener can also be added to these compositions to increase the viscosity or stiffness of the ink. For this purpose, low molecular weight water-soluble polymers are preferred as for example, the Carbowax polymers, a trademark for polyethylene glycol ethers. When polymeric thickeners are used it is preferred to use them in a range of about 1 to 10 percent by weight.

The printing ink compositions of this invention are the type which are adaptable to gravure or intaglio printing in general, and to a specific form of typographic or letter-press printing generally referred to as flexography or flexographic printing. These printing processes require a relatively low viscosity ink. The ink viscosities for intaglio and flexographic printing are usually measured by the Ford cup or Zahn cup methods in which the viscosity of the ink is measured by the time in seconds required for a metered amount of ink to pass through a predetermined orifice under the influence of gravity. When diluted for use on a printing press a characteristic range of viscosities for gravure or flexographic inks as measured by a 02 Zahn cup would be from 20 seconds to 40 seconds or in a 03 Zahn cup from 10 seconds to 30 seconds, roughly equivalent to 1 to 2 poises.

The gravure or intaglio printing operation involves flooding the low viscosity ink onto a metal cylinder which has the image to be printed engraved into it in the form of an array of small cells separated by walls. The array comprises from 30 to 200 rows of cells per inch depending on the screen ruling used to form the array. The depths of the cells vary from 6 to 40 microns depending on the density of the tone that is desired in the final print. A doctor blade, set against the surface of the cylinder, wipes excess ink from the surface and leaves the ink trapped in the cells to be transferred to the substrate. Thus each cell transfers a metered amount of ink. The engraving is done by differentially etching the depth of the cells in a copper jacket over a steel roll, which may then be chrome plated for increased wear resistance.

In printing the cylinder then contacts the substrate which is fed through a nip between the image cylinder and a rubber backup roll designed to produce pressures ranging from 100 to 500 lbs. per linear inch along the cylinder. Ink transfer occurs by absorption and/or capillary action to the substrate. For indirect or "offset" gravure ink transfer from the engraved image cylinder may be to a rubber transfer roller which carries the ink to the substrate.

Flexographic printing, so called because it employs soft flexible rubber printing plates, is, as noted above, a special form of typographic printing. The printing process employs a three roller train consisting of a rubber ink furnishing roll, a chrome plated steel metering roll having an overall engraved intaglio pattern which may be in the form of an array of cells with from 100 to 200 lines to the inch, and a plate roller on which the rubber printing plates are adhesively mounted. The substrate to be printed passes through the nip between the plate roll and a steel backup roll. Ink transfer results from wetting the substrate under pressure and by splitting of the ink film. In most presses the rubber ink furnishing roll turns at three times the speed of the Anilox (trademark of Interchemical Corp.) metering roll so that a shearing and doctoring action takes place, thus leaving a metered quantity of ink in the cells to be transferred to the rubber printing plate.

The action of a flexographic inking and printing system is accurately simulated by the flexographic hand proofers such as those sold by Pamarco Corp. A flexographic hand proofer consists of an engraved steel roll (Anilox) with a screen ruling between 100 and 200 lines per inch and a rubber roller in contact with it which simulates the rubber printing plate. In use ink is furnished to the nip between these two rollers. The rollers are rotated to distribute the ink evenly in the cells and on the rubber roller and a drawdown is taken on the substrate. The rubber roller lays the ink on the substrate in an even and uniform film approximately 8 microns thick as a rubber printing plate would. In the examples which follow such a hand proofer having an Anilox roller with a screen of 175 lines per inch was used to make prints on various types of stock. The hand proofer simulated a flexographic printing press in which low viscosity ink is transferred to a rubber printing plate and thence to the substrate. From the above description the similarities between flexographic printing and intaglio printing may be noted. Thus the hand proofer is also a reasonable facsimile of the gravure printing process.

The invention is further described by the examples which follow, in which all parts and percentages are by weight unless otherwise specificied.

EXAMPLES 1-3

A 20 percent (16.5 parts) aqueous solution of an ethyleneacrylic acid (18 percent acrylic acid polymerized therein, a melt index of 200 dg./min.), which had 90 percent of its free carboxyl groups neutralized with sodium hydroxide, was blended with 9.7 parts of Hansa yellow, 8.1 parts of methanol and 65.7 parts of water in a beaker with moderate agitation at 25° C. for one-half hour until a homogenous ink formulation was obtained having 26.2 percent solids.

A flexographic hand proofer consisting of an engraved steel ink supply (Anilox) roller and a rubber roller in contact with it which served to take up ink from the engraved supply roll (as a rubber printing plate would do) and lay it evenly on a substrate, was used to make prints on various types of stocks closely simulating the action of a commercial flexographic printing press.

Drawdowns made with this proofer and the above-described ink formulation on (1) pieces of Kromekote (trademark for Champion Papers, Inc.) cast coated label paper having one side cast coated, (2) uncoated offset paper, and (3) polyethylene film corona discharge treated to render it ink receptive produced evenly laid films on each substrate. In each instance the ink formulation followed the rolls of the proofer as a flexographic ink should and had the minimum permissible tackiness for transfer, as indicated by uniform splitting of the ink film between the Anilox roller and the rubber roller and between the rubber roller and the substrate.

Air drying of the printed substrates afforded a smooth but water soluble ink film of which the pigment formed 37 percent of the dried film. Drying for 3 minutes at 80° F. resulted in partial water insolubilization. Drying for 30 seconds at 140° C. afforded complete water insolubilization.

EXAMPLE 4

Fifteen parts of the sodium hydroxide neutralized ethyleneacrylic acid copolymer described in examples 1-3 were blended with 9 parts of Hansa yellow, 7.5 parts of Carbowax 1,500 (trademark for a polyethylene glycol ether) 7.5 parts of methanol and 61 parts of water in a beaker with moderate agitation at 25° C. for one-half hour until a homogeneous ink formulation was obtained. The solids content of this ink formulation was 31.5 percent and the pigment content, when the ink dries is 28.5 percent. This formulation followed the rolls of the hand proofer satisfactorily. On uncoated offset paper it had a smooth, rich print that quick set almost immediately because of water absorption into the paper, so that sheets could be piled upon one another immediately without danger of offsetting. Thirty seconds drying at 140° C. was sufficient to make the ink wholly insoluble in water so that it could not be washed off or smudged by fingerprints.

The above-described formulations have been demonstrated to be suitable for use as flexographic ink formulations and transfer from roll to web satisfactory. Their use on absorbent papers has an advantage over commonly used water soluble inks, in that quick-setting is possible and that complete drying and insolubilization can be accomplished within an acceptable residence time in a flexographic press drying oven.

EXAMPLES 5-15

An ammonium salt solution of an ethylene-acrylic acid copolymer was prepared by dispersing an ethylene-acrylic acid copolymer having 22 percent acrylic acid copolymerized therein and having a melt index of 350 dg./min. in water, heating to 85° C. and then adding aqueous ammonia solution (28 percent). This system was then heated to 95° C. and maintained at this temperature for about 20-30 minutes yielding a hazy solution of the ammonium salt of the copolymer. The exact proportions used for this preparation are 600 grams of the ethylene-acrylic acid copolymer, 170 grams of the 28 percent ammonium solution and 2,400 grams of water.

A predispersed (in water) phthalocyanine blue pigment (Monastral Blue B supplied by du Pont) was added to the above ammonium polymer salt solution in three separate portions, so as to afford pigment solutions containing 10, 15 and 20 percent pigment respectively. The polymer salt concentration in solution accordingly ranged from 13 to 18 percent. Each of these pigmented solutions were coated with a No. 12 Meyer Rod on bleached sulfite paper, aluminum foil, and "Corona treated" polyethylene film. Glass bottles were dip coated with the pigment solution. One set of coated samples was dried at room temperature. Another set of coated samples was dried at 120° C. for 2-5 minutes. Both the air-dried and elevated temperature dried ink coating showed excellent adhesion to paper, glass, aluminum foil and treated polyethylene film as indicated by the scotch tape test which involves sticking the scotch tape to the treated substrate and then ripping it off rapidly, observing whether or not the coating comes off with the scotch tape or not. In the case of excellent adhesion no coating comes off with the scotch tape. After drying, the coatings were no longer water sensitive since ammonia is evolved during drying and the resulting polymer film is the original ethylene acrylic acid copolymer used to prepare the ammonium salt.

EXAMPLES 16–19

The ammonium salt solution prepared as described in example 5 was diluted with ethanol and pigmented with Monastral Blue B to give the following formulation containing 8 percent pigment and 15 percent polymer salt.

75 grams of ethylene-acrylic acid copolymer ammonium salt
25 grams of ethanol
26.5 grams of Monastral Blue B The pigmented solution was coated on bleached sulfite paper, aluminum foil, polyethylene film, and "Cornoa treated" polyethylene film using a No. 12 Meyer Rod. One set of samples was dried at room temperature, another at 120° C. for 2-5 minutes Adhesion, gloss, scuff resistance, and water resistance were observed as follows:

Adhesion   Adhesion was observed by using the "scotch tape test" as described in examples 5–15. Adhesion was excellent on paper, aluminum foil and treated polyethylene film.

Gloss   Gloss was visually observed and rated qualitatively Gloss was excellent on all substrates examined in this example. Prints were obviously shiny.

Scuff resistance   Scuff resistance was determined by scraping the dried coating with the fingernail and observing whether the coating scratched or rubbed off easily. Excellent scuff resistance was obtained on all.

Water resistence   Water resistance was measured by wetting the coating surface with water and observing whether the coating was solubilized. LIght rubbing with the finger was also used to assess "smearing" tendencies. The coatings were not solubilized by water in any case, even after air drying at room temperature nor was any smearing observed. This formulation is similar to conventional flexographic ink formulations which use water-alcohol mixtures as solvents.

EXAMPLE 20

A salt solution was prepared of an ethylene-acrylic acid copolymer, having 22 percent acrylic acid copolymerized therein and having a melt index of 350 dg./min., by the method described in examples 5–15, excepting that a mixture of ammonia and sodium hydroxide was used to neutralize the acrylic acid. The formulation was as follows:

100 grams ethylene acrylic acid copolymer
2.7 grams sodium hydroxide
18 grams ammonia (28 percent aqueous solution)
285 grams water The above formulation contains sufficient sodium hydroxide to neutralize 24 percent of the available acrylic acid groups in the copolymer and excess ammonia to neutralize the remaining acid groups. The final solution contains 25 percent solids.

EXAMPLES 21–25

The following pigmented formulations were prepared and Zahn cup viscosity was measured as a function of total solids. The solution prepared in example 20 was used as the vehicle in all cases.

| Example | 21 | 22 | 23 | 24 | 25 |
|---|---|---|---|---|---|
| Polymer salt solution, g | 100 | 100 | 100 | 100 | 100 |
| Ethanol | | 75 | | | |
| Monastral Blue (38.5% solids) | 65 | 65 | | 65 | 65 |
| TiO$_2$ (Tn-pure R-902) | | | 50 | | |
| Octanol | 1.65 | 1.65 | | 1.65 | 1.65 |
| Water | | | | 10 | 28 |
| Ball milling time, hours | 4 | 4 | 48 | 4 | 4 |
| Pigment/binder ratio | 1/1 | 1/1 | 2/1 | 1/1 | 1/1 |
| Total solids | 30 | 20.8 | 50 | 28 | 25 |
| Viscosity, sec. (Zahn cup) | 28 | 11.2 | 101 | 15.4 | 9.9 |

The above formulations were milled in a ceramic pebble mill for the periods of time indicated. Viscosities were measured using a Number Two Zahn cup under standard conditions at 25° C.

The results illustrate that all of the formulations except example 23 are in acceptable viscosity range for flexographic inks. The formulation in example 23 was easily diluted to lower solids and lower viscosity and illustrates that ink concentrates can be prepared for handling convenience and subsequently diluted before use.

The above formulations were coated onto bleached sulfite paper, aluminum foil, polyethylene film and "Corona treated" polyethylene film using a No. 12 Meyer Rod. Samples were dried at 120° C. for 2-5 minutes. Adhesion, gloss, scuff resistance and water resistance were comparable to the properties obtained in examples 16–19.

What is claimed is:
1. Printing ink compositions comprising:
   a. about 5 to 30 percent by weight of an inorganic salt of an interpolymer consisting of ethylene and 1 to 50 mole percent of the total interpolymer of methacrylic acid or acrylic acid, said salt being at least 90 percent neutralized and having monovalent cations selected from the group consisting of Na$^+$, K$^+$, Li$^+$, and NH4$^+$;
   b. about 5 to 50 percent by weight of pigment;
   c. about 0 to 40 percent by weight of an aliphatic monohydroxy alcohol selected from the class consisting of methanol, ethanol and isopropanol; and
   d. the remainder water.
2. Composition claimed in claim 1 wherein the acrylic acid salt moiety content comprises about 3 to 25 mole percent of the total interpolymer salt.
3. Composition claimed in claim 1 wherein the monovalent cation is an alkali metal cation.
4. Composition claimed in claim 3 wherein the monovalent cation is Na$^+$.
5. Composition claimed in claim 1 wherein the monovalent cation is NH$_4^+$.
6. Composition claimed in claim 1 wherein the polymer salt contains both alkali metal cations and NH$_4^+$.
7. Composition claimed in claim 1 wherein the pigment is Hansa yellow.
8. Composition claimed in claim 1 wherein the pigment is phthalocyanine blue.
9. Composition claimed in claim 1 wherein the pigment is titanium dioxide.
10. Composition claimed in claim 1 wherein the aliphatic alcohol is ethanol.

UNITED STATES PATENT OFFICE
CERTIFICATE OF CORRECTION

Patent No. 3,607,813      Dated September 21, 1971

Inventor(s) Chester L. Purcell et al.

It is certified that error appears in the above-identified patent and that said Letters Patent are hereby corrected as shown below:

Column 1, line 48, should read $$CH_2=CHCO_2H \text{ and } CH_2=CCH_3CO_2H.$$

Signed and sealed this 14th day of March 1972.

(SEAL)
Attest:

EDWARD M. FLETCHER, JR.
Attesting Officer

ROBERT GOTTSCHALK
Commissioner of Patents